Oct. 23, 1962  R. L. NASH ETAL  3,059,836
BEARING AND SEALING STRUCTURE FOR A ROTARY COMPRESSOR
Original Filed May 11, 1954  5 Sheets-Sheet 1

INVENTORS
CLARENCE E. COX
RICHARD L. NASH
BY
Raymond S. Miller
ATTORNEY

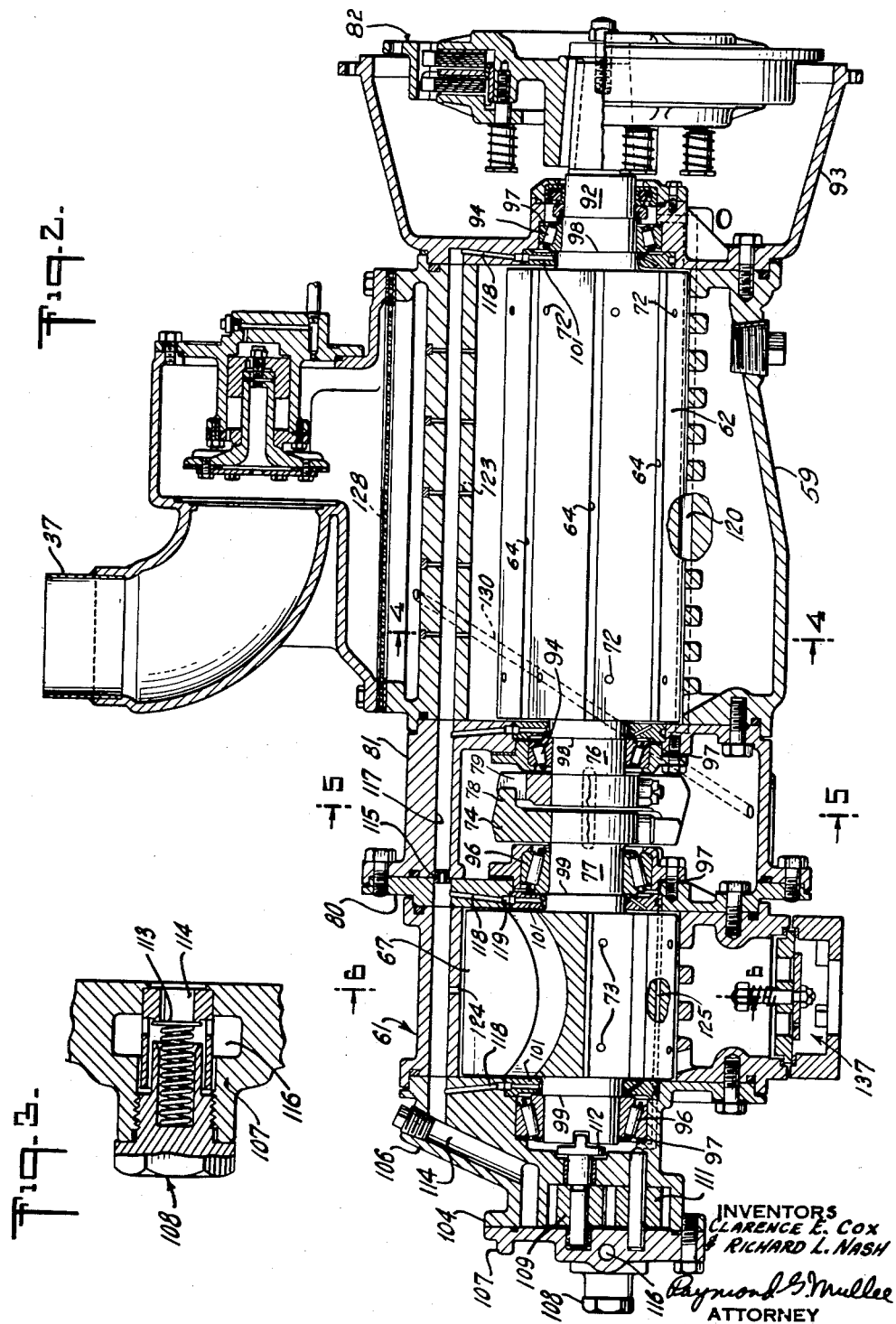

Oct. 23, 1962 R. L. NASH ETAL 3,059,836
BEARING AND SEALING STRUCTURE FOR A ROTARY COMPRESSOR
Original Filed May 11, 1954 5 Sheets-Sheet 3
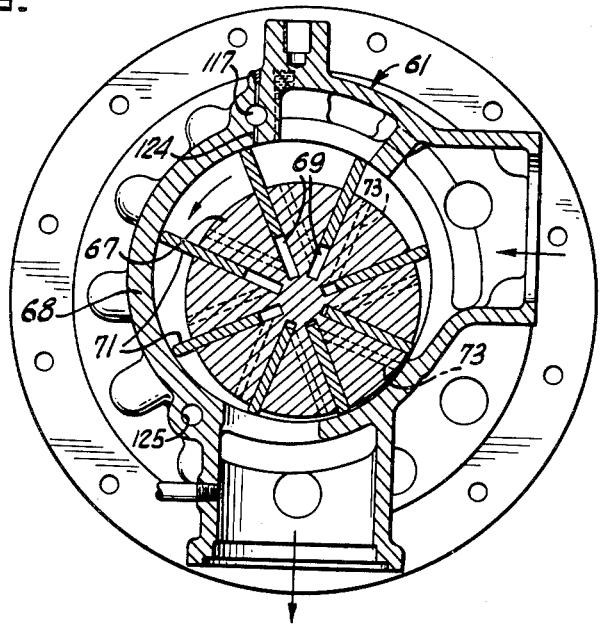
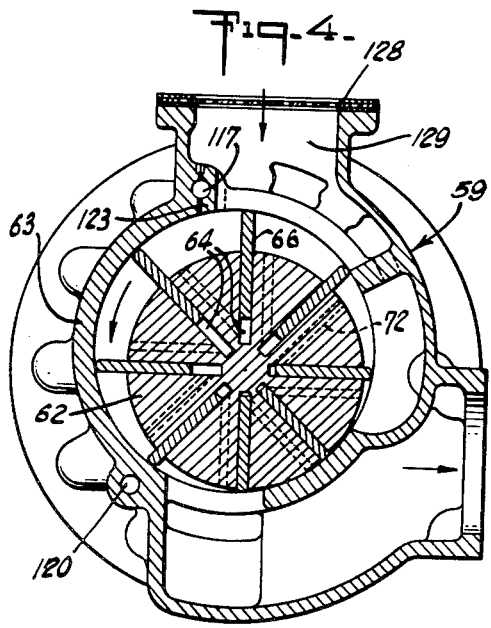
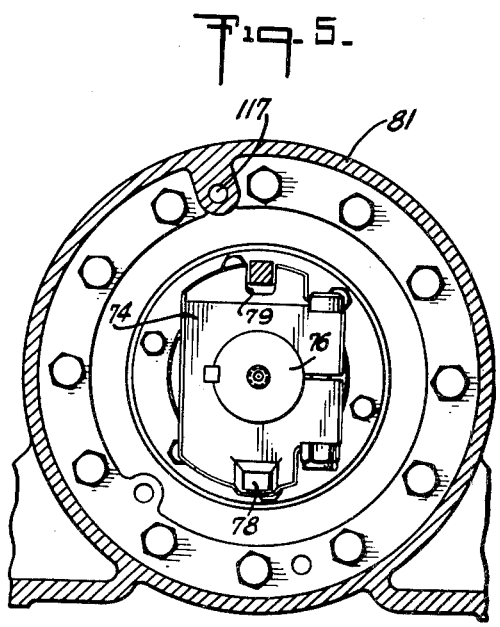
INVENTORS
CLARENCE E. COX
RICHARD L. NASH
BY
Raymond G. Mueller
ATTORNEY

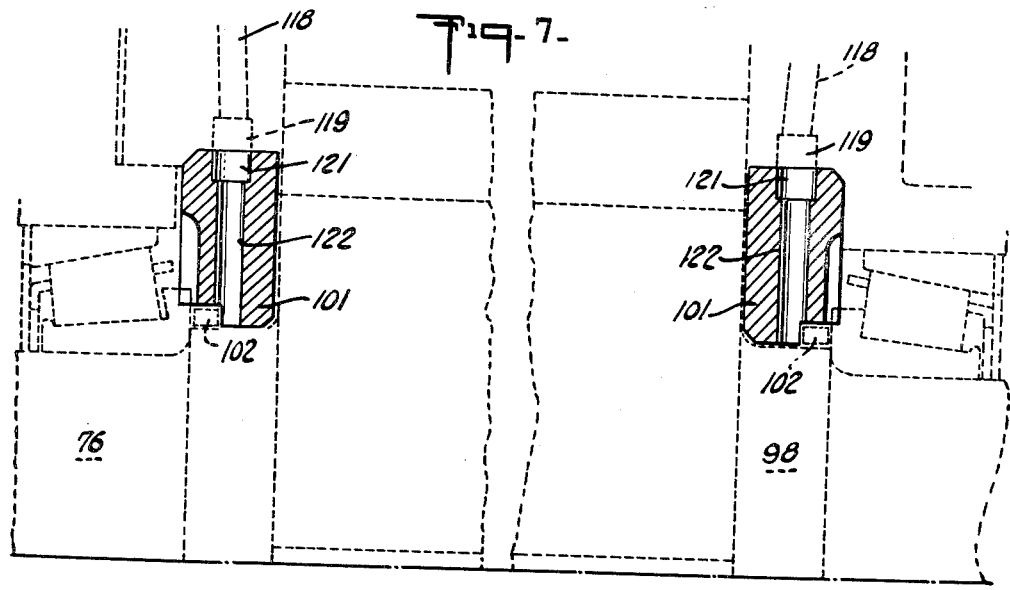
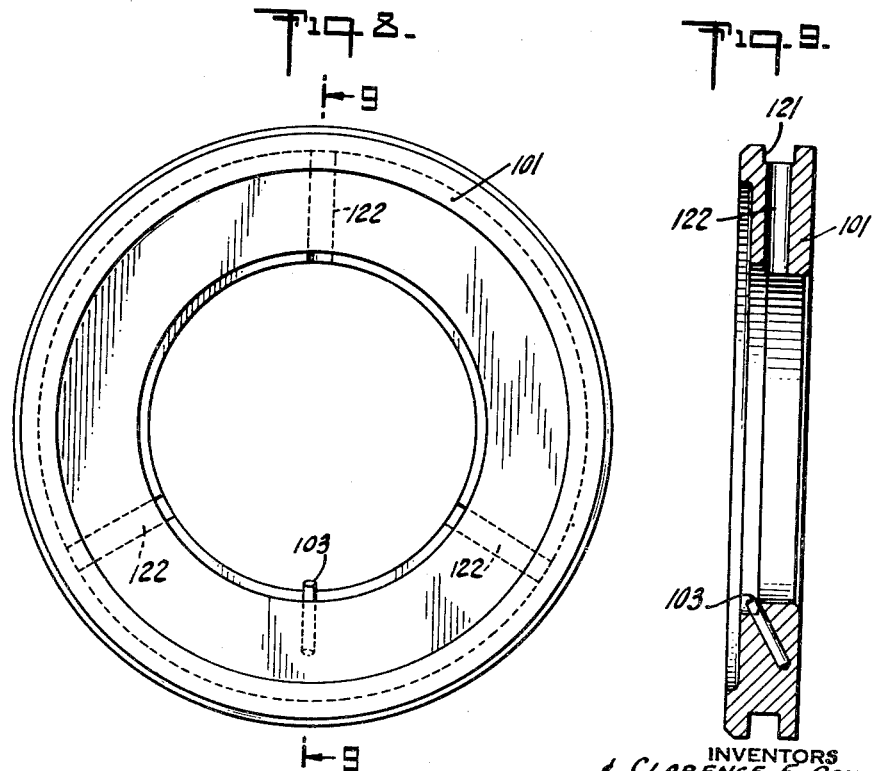

Oct. 23, 1962   R. L. NASH ETAL   3,059,836
BEARING AND SEALING STRUCTURE FOR A ROTARY COMPRESSOR
Original Filed May 11, 1954   5 Sheets-Sheet 5

INVENTOR.
CLARENCE E. COX
BY & RICHARD L. NASH

Raymond G. Mullee
ATTORNEY

United States Patent Office 3,059,836
Patented Oct. 23, 1962

3,059,836
BEARING AND SEALING STRUCTURE FOR A ROTARY COMPRESSOR
Richard L. Nash and Clarence E. Cox, Franklin, Pa., assignors to Chicago Pneumatic Tool Company, New York, N.Y., a corporation of New Jersey
Original application May 11, 1954, Ser. No. 428,942. Divided and this application Oct. 5, 1960, Ser. No. 60,730
4 Claims. (Cl. 230—205)

This invention relates to a bearing and sealing structure for a rotary type air compressor. This present application is a division of our application for a Rotary Fluid Compressor filed May 11, 1954, bearing Serial Number 428,942, now abandoned.

An object of the invention is to provide means for efficiently sealing the compression chambers of a rotary compressor to prevent loss of air and consequent loss of compression.

A further object of the invention is to provide in a compound rotary compressor having high and low pressure stages, oil feed lines to the compression chambers so designed as to provide an ample amount of oil for lubricating, cooling and sealing purposes according to the needs of each of the compression stages.

Another object of the invention is to provide means for sealing out dirt and debris from entering the compression chambers and contaminating the sealing and lubricating oil supply.

A still further object of the invention is to provide practical and efficient mountings for the shaft of a rotary compressor.

These and further objects of the invention will become more apparent from the following description when taken in conjunction with the accompanying drawings, wherein:

FIG. 2 is a longitudinal sectional view of the rotary compressor unit;

FIG. 3 is a sectional view taken through a pressure relief valve used on an oil pump for the compressor unit;

FIGS. 4, 5 and 6 are cross-sectional views taken on lines 4—4, 5—5 and 6—6 of FIG. 2;

FIG. 7 is a fragmentary sectional view of a rotor sealing and positioning means of the compressor unit;

FIG. 8 is a plan view of a floating head used in the sealing means shown in FIG. 7;

FIG. 9 is a sectional view taken on line 9—9 of FIG. 8; and

Figure 1:
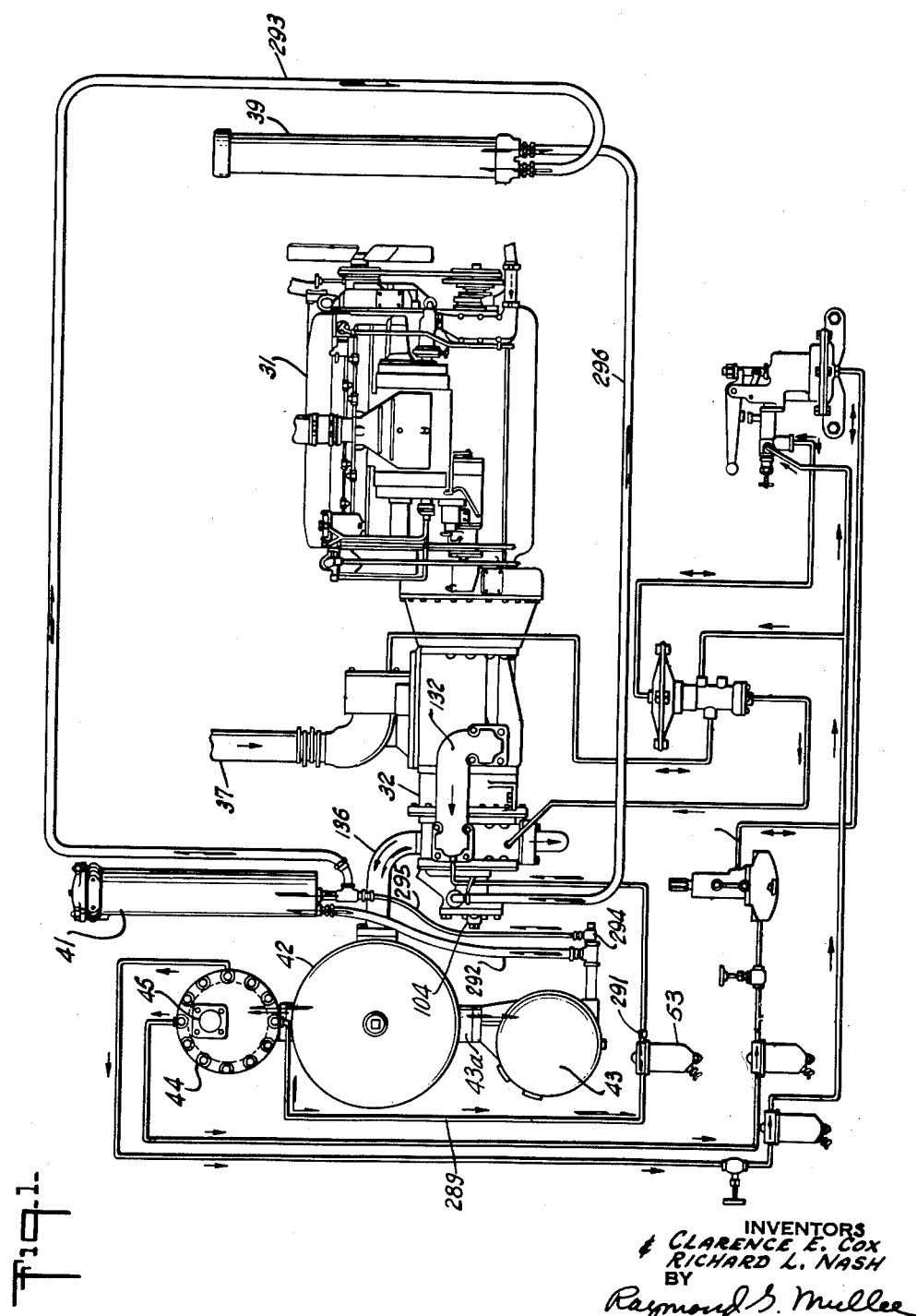
FIG. 1 is a composite schematic illustration of a rotary compressor machine embodying the invention.
Figure 10:
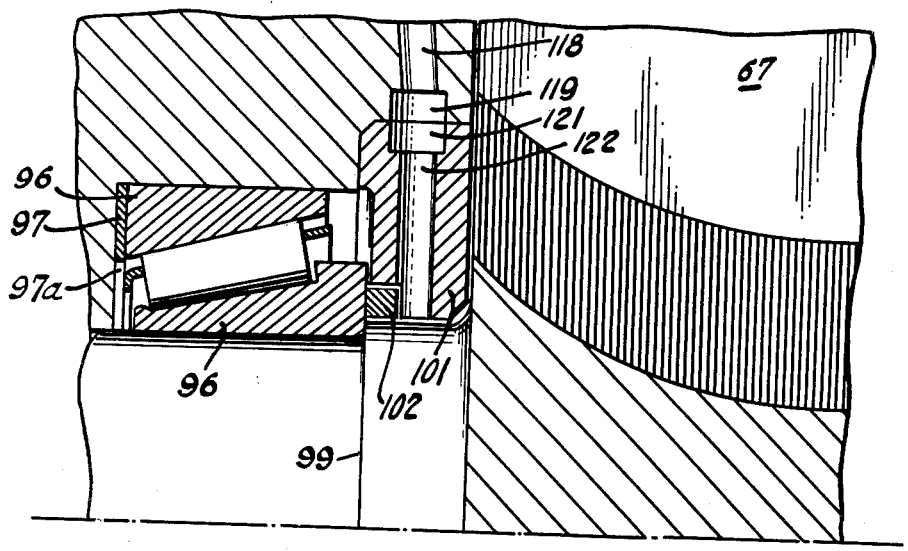

FIG. 10 is an enlarged fragmentary sectional view of the floating head and sealing ring of FIG. 7.

The machine disclosed in the drawings comprises in general a rotary air compressor unit 32 having an intake section 37 through which air from the atmosphere enters the compressor. The compressed air is discharged from the compressor unit through a one-way check valve 137 into a pipe 136 which connects the discharge end of the compressor with an air receiver 42. Compressed air entering the receiver is charged with oil supplied to the compressor unit from an associated oil storage tank 43 by means of an oil pump assembly 104. The oil tank is disposed below the receiver, and has a pipe connection 43a with the latter whereby oil settling out of the receiver drops down into the oil tank below. The receiver air, together with any residual oil remaining therein flows upwardly through a pipe connection into an oil separator tank 44 above. The residual oil is separated from the air admitted to the separator tank by means of suitable filtering elements in the latter, and the separated oil returns under force of air pressure in the separator tank over a return pipe 289 to the compressor unit for recirculation through the latter. Demand air substantially cleared of oil is available from a demand tap 46 of the separator tank.

The compressor unit is a feature of this invention and will now be described in greater detail. It is a compound rotary air compressor unit having a low pressure stage portion 59, and a high pressure stage portion 61 (FIGS. 2 and 4). The low pressure portion 59 has a simple slidable vane type rotor 62 which is eccentrically arranged in a case 63, or compression chamber, and has eight longitudinal radially arranged slots 64, each slidably maintaining a non-metallic blade 66. The high pressure portion 61 (FIGS. 2 and 6) has a simple vane type rotor 67 which is eccentrically arranged in a case or compression chamber 68, and has eight longitudinal radially arranged slots 69, each slidably maintaining a non-metallic blade 71. The rotor and blade arrangement of each stage is identical and differ only in the length thereof. It is to be noted that a plurality of passageways 72, 73 extending between the periphery of each rotor 62, 67, and the lower end of each slot 64, 69 provide a pressure means for each blade 66, 71 respectively, so that the latter will be constantly urged outwardly into contact with the inner periphery of the cases 63 and 68 respectively, by virtue of the air pressure acting on the lower edge of each blade.

The low and high stage rotors are connected for rotation as a unit by means of coupling members 74 which are keyed to shaft extensions 76, 77 of the low and high stage rotors respectively. Each coupling member 74 has a finger 78 which projects laterally into engagement with a slotted portion 79 of the opposite coupling member. A tandem piece 81, enclosing the rotor coupling arrangement, is adapted to maintain the low and high pressure portions 59, 61 in axial alignment. A head piece 80 is arranged between the tandem piece 81 and the high pressure case 68.

The rotor 62 of the low pressure stage has an extension 92 at its right end (FIG. 2) which is drivingly coupled by a suitable spring loaded slip clutch assembly 82 to an engine 31. A tandem piece 93 enclosing the clutch assembly 82 is adapted to maintain the compressor unit in fixed alignment with the engine 31.

The rotors 62, 67 of the low and high pressure stages are respectively mounted for rotary movement upon sets of tapered roller bearings 94 and 96. From the arrangement of the bearings it will be seen that the axial movement of each rotor 62, 67 is limited to the lateral play inherent in each bearing which may be in the order of a few thousandths of an inch. In the assembly of the compressor 32, the final setting, or positioning of the bearings 94, 96 may be established by the use of shims 97. In any case, the inner race of each roller bearing is press fitted to a rotor shaft extension while the end of each inner race of bearings 94, 96 seat against shaft shoulders 98, 99 respectively. The shims 97 are adjustable in thickness by adding or removing laminations thereof. They have a large central opening 97a disposed opposite the inner races of the roller bearings 94, 96. The solid area of the shims abut the outer end wall of the outer races of the bearings and they act through the outer races and the inner races to position or center the rotors 62, 67 axially so that the latter will rotate clear of the adjacent end plates or walls of the compression chambers.

Adjacent each end of the low and high pressure rotors 62, 67 is a floating head 101 (FIGS. 7-10) which serves as an aid for use with anti-friction bearings, particularly wherein it is desired to press fit the inner races to the shaft as in the case of the present arrangement. By means of the floating head, the inner surfaces of the rotor end closures are extended nearly to the shaft and the inner ends of rotor slots 64, 69 are covered to prevent, or reduce, air leakage. In disassembling the compressor, the floating heads will allow for removal of the rotor from its casing without the necessity of removing the inner bearing race from its press-fitted engagement with the rotor shaft extension.

The inner edge of each floating head 101 is counterbored to receive a shaft sealing ring 102 (FIG. 10), which has a gap (not shown) providing an opening required for ring flexibility, and to also permit a small amount of oil and air under pressure to leak through for lubrication of the adjacent bearing. A small pin 103 secured in the floating head 101 projects into the gap of a sealing ring to prevent the ring from turning with the rotor shaft. Each sealing ring 102 is held against the side of the inner bearing race by virtue of the pressure developed within the compressor chamber, thus reducing leakage of compressed air via the roller bearings.

An oil pump assembly 104 (FIGS. 2 and 3) is mounted at the rear end of the high pressure portion 61 and includes: a body assembly 106 which is secured to the end of the frame 68; a cover 107 secured to the end of the body assembly; a relief valve assembly 108 positioned in the cover 107; a set of oil pump gears 109, 111 (spur gear type), gear 109 being a drive gear, and gear 111 being a driven gear; and a driving gear shaft 112 which is flexibly coupled, as shown, to the end of the high pressure shaft extension. The oil pump 104 is used to pressurize oil and circulate it through the compressor 32 for air cooling purposes and for sealing and lubricating purposes as will be presently explained. The oil pump also serves the purpose of automatically metering the oil for flow in accordance with demand requirements. The relief valve assembly 108 includes a valve 113 (FIG. 3) which is spring loaded to seat against an opening connected with an oil pump discharge passageway 114; when the valve is unseated due to a rise in oil pressure beyond a predetermined maximum, oil flow occurs around the valve and into a passageway 116 which leads back into an oil pump inlet chamber (not shown). In this manner damage to the oil pump is avoided whenever a restriction develops which would hinder free oil flow, such as may occur under extreme cold weather conditions wherein the oil may become sluggish or congealed.

The oil discharge passageway 114 connects with a longitudinal passageway 117 which extends through the high pressure case 68, head piece 80, tandem piece 81, low pressure case 63 and terminates in the coupling assembly tandem piece 93. A series of passageways 118 extend downwardly from the passageway 117 and each terminates in a recess 119 which is in alignment with circumferential groove 121 formed on the outer periphery of each floating head 101. Radially extending from the grooves 121 are passageways 122 formed in each floating head 101, the lower ends of which are in open engagement with the counterbores containing sealing rings 102. In such manner oil under pressure from the oil pump 104 flows through each floating head 101 and about the inner periphery thereof and around the shaft into the end of the compression chambers 63, 68 to prevent the escape of air being pressurized therein. Also, as previously mentioned, the oil forces the sealing rings 102 into contact with the edge of the inner bearing races of roller bearings 94, 96 for sealing purposes.

Oil from passageway 117 is also directed downwardly via passageway 123, 124 into compression chambers 63, 68 respectively, wherein it is dispersed in an atomized condition for purposes of reducing the temperature of the air during compression. As best seen in FIGS. 4 and 6, the oil is injected into the air during and at the beginning of compression thereof, and eliminates the need for interstage air cooling.

A choke 115 arranged in the passageway 117 serves to maintain sufficient pressure in the upstream end of passageway 117 so that an ample supply of oil is fed into the high pressure portion 61 during compressor operation.

A scavenger passageway 120 is located in the low pressure case 63 while a similar scavenger passageway 125 is located in the high pressure case 68; the scavenger passageways 120, 125 are arranged to conduct the oil, which leaks past roller bearings 94, 96, back into the tandem piece 81. Such oil is conducted from the tandem piece 81 back to the air inlet chamber 129 via a passageway 130; in this manner the leakage oil is returned to the compressor air flow circuit from whence it is circulated with the air and ultimately is separated and returned to the inlet side of oil pump 104, as will be described hereinafter.

Intake air entering the intake section 37 flows into the low pressure stage through a screen 128 having the form of a flat perforated sheet arranged at the intake end of the low pressure stage. The screen acts as a guard to prevent any debris, or loose parts, from accidentally falling into the compressor and causing damage therein.

So that the oil supplied to the compressor stages will be free of dirt and will be cool to reduce the temperature of air in the process of compression, suitable oil cooling and dirt filtering means is provided. To this end, oil being returned from the receiver 42 to the oil tank 43 below flows under pressure of receiver air through a pipeline 292 into an oil filter 41 and out of the latter through a pipeline 293 to an oil cooler 39. A relief valve 294 is arranged to bypass oil around the oil filter 41 by way of a pipe 295 directly into pipe 293. This bypass arrangement is provided to assure flow of oil in the oil circulatory system in the event the oil filter 41 should fail or become so clogged with dirt that oil could not flow therethrough at the desired rate. A pipeline 296 conducts the oil from the oil cooler 39 to the inlet of the oil pump 104.

The residual oil that is separated from the air in the separator 44 and received into line 289 passes through a filter 53 in line 289, a choke 291, and empties into an interstage pipe 132. The latter connects the discharge end of the low pressure stage with the intake end of the high pressure stage. The latter intake end has a lower air pressure than that in the separator 44 so that the residual oil is forced by the greater force of air in the separator and by suction action of the high pressure stage 61 into the interstage pipe 132. The residual oil is drawn into the high pressure stage and recirculated through the latter.

What is claimed is:

1. A rotary compressor consisting essentially of: an open ended casing; a pair of end plates removably mounted over opposite ends of the casing; a compression chamber defined by the interior of the casing; each end plate having a first circular recess in its inner face, and a second circular recess of lesser diameter adjacent to the first recess, the second recess having an end wall and a bore of reduced diameter through the latter to the outside of the end plate; a rotor arranged in the chamber for compressing air therein, the rotor having a plurality of open ended longitudinal slots with blades radially slidable therein; a supporting shaft extending from each end of the rotor through the bore of the corresponding end plate, each shaft extension having a slight radially raised collar adjacent the rotor; an annular floating head disposed in each of the first recesses having an inner face in close spaced relation to the rotor and covering the open ends of the longitudinal slots of the rotor, and the floating head having an inner diameter surface in close spaced relation to the peripheral surface of the related collar; and a tapered roller bearing disposed in each of the second recesses having an inner race press fitted onto the related shaft extension in such manner that an inner end wall of the said race abuts the corresponding collar and in part rises parallel to the outer face of the related floating head, whereby after either end plate is removed from the casing, the rotor is removable from the casing as a unit with the floating heads without the necessity of removing the inner races of the bearings from the shaft extensions.

2. A rotary compressor according to claim 1, wherein each floating head includes a radial lube passage for directing lubricating fluid under constant pressure through the floating head to the surface of the related collar; a shallow annular cavity in the outer face of each floating head disposed opposite the inner end of the corresponding tapered roller bearing, an annular undercut formed in the inner diameter surface of each floating head adjacent to the inner end wall of the inner race of the corresponding tapered roller bearing so that communication is established between the lube passage and the shallow cavity with the related tapered roller bearing, and a flexible split sealing ring disposed in each undercut about the related collar capable of slight lateral and radial movements, the sealing ring being adapted under pressure of lubricating fluid from the lube passage to the undercut to press laterally against the inner end wall of the inner race of the related tapered roller bearing and to flex radially relative to the opposed wall of the undercut so as to substantially block off communication of the undercut with the said shallow cavity and, as a consequence, block leakage of air about the rotor shaft from the compression chamber.

3. A rotary compressor according to claim 2, wherein the split in the sealing ring is defined by a small gap adapted to allow leakage of a restricted amount of lubricating fluid therethrough from the lube passage to the related bearing for purposes of lubrication.

4. A rotary compressor according to claim 3, wherein a pin projects from the inner diameter surface of each floating head into the gap of the related sealing ring to prevent relative movement of the one to the other and to provide a gap in the sealing ring of a predetermined size in the unflexed condition of the sealing ring.

References Cited in the file of this patent

UNITED STATES PATENTS

| | | |
|---|---|---|
| 1,906,464 | Hapgood | May 2, 1933 |
| 2,103,524 | Ernst | Dec. 28, 1937 |
| 2,126,279 | Redfield et al. | Aug. 9, 1938 |
| 2,159,720 | Wahlmark | May 23, 1939 |
| 2,264,616 | Buckbee | Dec. 2, 1941 |
| 2,641,405 | Le Valley | June 9, 1953 |
| 2,667,125 | Foss et al. | Jan. 26, 1954 |
| 2,780,406 | Feldbush | Feb. 5, 1957 |